United States Patent
Fallon et al.

(10) Patent No.: US 10,480,656 B2
(45) Date of Patent: Nov. 19, 2019

(54) BRIDGE TAPE WITH DIRECTED FOAM EXPANSION AND METHOD FOR SEALING HOLES IN SHEET METAL OR PLASTIC PARTS OF AUTOMOBILE BODIES

(71) Applicant: TESA SE, Norderstedt (DE)

(72) Inventors: Robert Fallon, New Hudson, MI (US); Elliot Sedlecky, Grand Rapids, MI (US); Patrick Boecker, East Grand Rapids, MI (US); Andreas Meier, East Grand Rapids, MI (US)

(73) Assignee: TESA SE, Norderstedt (DE)

( * ) Notice: Subject to any disclaimer, the term of this patent is extended or adjusted under 35 U.S.C. 154(b) by 555 days.

(21) Appl. No.: 15/242,959

(22) Filed: Aug. 22, 2016

(65) Prior Publication Data

US 2018/0051808 A1 Feb. 22, 2018

(51) Int. Cl.
*F16J 15/10* (2006.01)
*B32B 5/20* (2006.01)
(Continued)

(52) U.S. Cl.
CPC ............. *F16J 15/108* (2013.01); *B32B 3/266* (2013.01); *B32B 5/022* (2013.01); *B32B 5/20* (2013.01); *B32B 7/06* (2013.01); *B32B 7/08* (2013.01); *B32B 7/12* (2013.01); *B32B 27/06* (2013.01); *B32B 27/306* (2013.01); *C09J 7/29* (2018.01);
(Continued)

(58) Field of Classification Search
CPC ........ F16J 15/102; F16J 15/108; F16J 15/022; C09J 7/29; C09J 2201/20; C09J 2205/106; C09J 2205/11; C09J 2400/263; B32B 7/06; B32B 7/08; B32B 7/12; B32B 5/20; B32B 5/022; B32B 3/266; B32B 27/306; B32B 2581/00; C08K 9/10; E04B 1/6812; E06B 1/62; E06B 2001/626; Y10T 428/249923; Y10T 428/233; Y10T 428/1476; Y10T 428/14; Y10T 428/28; Y10T 428/24273; Y10T 428/249983

See application file for complete search history.

(56) References Cited

U.S. PATENT DOCUMENTS 4,204,373 A * 5/1980 Davidson .................. E06B 1/64
 428/71
4,397,914 A 8/1983 Miura et al.
(Continued)

FOREIGN PATENT DOCUMENTS

EP 1 154 002 A1 11/2001
EP 1 889 715 A1 2/2008
(Continued)

OTHER PUBLICATIONS

Translation of Office Action dated Jul. 20, 2018, in connection with Japanese Patent Application No. 2017-5445801.
(Continued)

*Primary Examiner* — Patricia L. Nordmeyer
(74) *Attorney, Agent, or Firm* — Norris McLaughlin, P.A.

(57) ABSTRACT

Bridge tape with directed foam expansion comprised of thermally foamable composition, useful for applying coating material through holes in the tape to a substrate beneath the tape, after which the holes can be sealed by heating to cause the foamable composition to foam and the foam to seal the holes.

10 Claims, 2 Drawing Sheets

Figure 1:
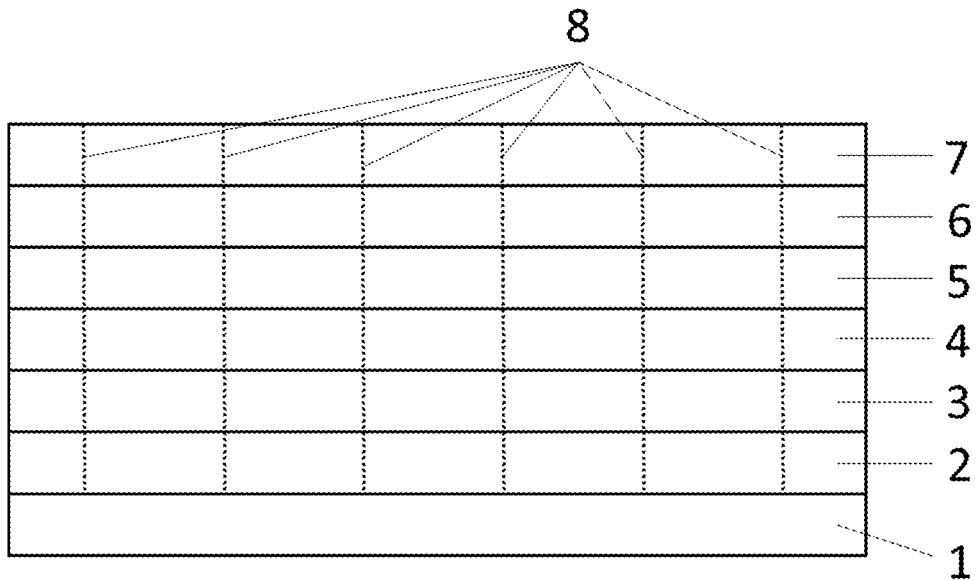

(51) Int. Cl.
*B32B 3/26* (2006.01)
*C09J 7/29* (2018.01)
*B32B 7/06* (2019.01)
*B32B 7/12* (2006.01)
*B32B 7/08* (2019.01)
*B32B 27/06* (2006.01)
*B32B 27/30* (2006.01)
*B32B 5/02* (2006.01)
*C08K 9/10* (2006.01)

(52) U.S. Cl.
CPC ......... *F16J 15/102* (2013.01); *B32B 2581/00* (2013.01); *C08K 9/10* (2013.01); *C09J 2201/20* (2013.01); *C09J 2205/106* (2013.01); *C09J 2205/11* (2013.01); *C09J 2400/263* (2013.01)

(56) References Cited

U.S. PATENT DOCUMENTS

| | | | | |
|---|---|---|---|---|
| 5,846,622 | A * | 12/1998 | Imaeda | B32B 5/18 428/40.1 |
| 6,672,597 | B1 * | 1/2004 | Irrgeher | E04B 1/6812 229/87.05 |
| 8,241,721 | B2 * | 8/2012 | Deiss | E04B 1/6812 428/304.4 |
| 8,318,280 | B2 * | 11/2012 | Deiss | E04B 1/6812 156/184 |
| 8,329,275 | B2 * | 12/2012 | Deiss | E04B 1/6812 428/158 |
| 8,349,426 | B2 * | 1/2013 | Deiss | E04B 1/6812 428/40.1 |
| 8,551,594 | B2 * | 10/2013 | Deiss | E04B 1/6812 428/131 |
| 8,764,024 | B2 * | 7/2014 | Deiss | E06B 1/62 277/651 |
| 9,540,802 | B2 * | 1/2017 | Deiss | E04B 1/6812 |
| 2007/0207306 | A1 * | 9/2007 | Broughton | B32B 5/18 428/304.4 |
| 2008/0029919 | A1 | 2/2008 | Howe et al. | |
| 2008/0099944 | A1 | 5/2008 | Lipprandt et al. | |
| 2011/0143121 | A1 * | 6/2011 | Deiss | E04B 1/6812 428/317.1 |
| 2011/0143122 | A1 * | 6/2011 | Deiss | E04B 1/6812 428/317.1 |
| 2018/0022062 | A1 | 1/2018 | Fallon | |

FOREIGN PATENT DOCUMENTS

| | | |
|---|---|---|
| JP | 57-151345 A | 9/1982 |
| JP | 2007532382 A | 11/2007 |
| JP | 200844368 A | 2/2008 |
| KR | 10-2007-0012463 A | 1/2007 |
| KR | 10 2008 0015718 A | 2/2008 |
| WO | 2005/097582 A1 | 10/2005 |

OTHER PUBLICATIONS

Office Action dated Nov. 21, 2018, and issued in connection with Korean Patent Application No. 10-2017-7026852.
International Search Report dated May 4, 2016, in connection with PCT International Application No. PCT/EP2016/053746.
"Handbook of Pressure Sensitive Adhesive Technology" by Donatas Satas (van Nostrand, 1989).

* cited by examiner

BRIDGE TAPE WITH DIRECTED FOAM EXPANSION AND METHOD FOR SEALING HOLES IN SHEET METAL OR PLASTIC PARTS OF AUTOMOBILE BODIES

The present invention pertains to a bridge tape and the use of the bridge tape for permanently sealing openings, such as holes, especially in metal sheets or plastic parts of automobile bodies, before or after the so-called e-coating of such metal sheets or plastic parts.

BACKGROUND OF THE INVENTION

In the present state of the art, OEM (Original Equipment Manufacturers) of automobile vehicles need to seal openings, such as holes and seams in the vehicles against entry into the opening of a variety of environmental elements, such as water, dirt, and the like, in order to help avoid corrosion and noise. For most applications putty, a pumpable material, plugs, Butyl or other types of sealing patches are used. However, most of these materials must be applied after e-coat in order to allow the inner cavities to be coated before sealing the cavities off as desired.

Some of the materials used for this purpose will shrink when the e.g. automobile body is passed through a paint drying oven as part of the final finish of the automobile body, and such shrinkage can create a leak into the previously-sealed opening.

Furthermore, some of the openings that need to be sealed are in areas that are not accessible after the vehicle has been welded together.

It is an object of the present invention to overcome the foregoing difficulties, by providing a sealant tape that can be applied to such openings either before or after e-coating, which will allow e-coating of the cavities inside the openings even after the sealant tape has been applied over the openings, and subsequently provide an effective seal for such openings.

SUMMARY OF THE INVENTION

In accordance with the present invention, there is provided a bridge tape which can be die cut to form patches of appropriate sizes to cover such openings, and which, if applied prior to e-coating of the sheet metal or plastic part, allows for the passing of e-coat fluid through the patch and into the cavities, and also through which excess e-coating fluids can drain out of said cavities.

The bridge tape of the present invention is constructed of two backings/carriers which are made of the same or different material (cloth, fleece, film . . . ) and a layer of a foamable composition in-between. One or both backings/carriers may optional have an adhesive coating, or a two-sided adhesive tape, i.e., a "transfer tape" which face the inner side in order to fix the foamable composition. In addition, one backing/carrier has an adhesive coating, or a two-sided adhesive tape, i.e., a "transfer tape" on the outer side. The outer coating layer may be covered by a release liner for protection and handling purpose. The tape is perforated with a plurality of holes, if it is to be applied prior to e-coating, to allow for passing of the e-coat fluid through the holes. The two backings/carriers are fixed to each other by thin filaments, threads or pins so that the foamable composition during expansion is directed in xy-direction, i.e. parallel to the backing/carrier layers towards the holes in order to close these. The fixation prevents the laminate from expansion in z-direction, i.e. perpendicular to the layers.

Preferably the size of the backing/carrier with the outer adhesive coating or transfer tape is a little bit smaller than the rest of the laminate, i.e. foam and second backing, thus the foamable component can attach the substrate (metal or plastic part) along the bridge tape border edge.

When a patch of the bridge tape is applied over an opening in the sheet metal or plastic part, e-coating fluid can pass through the holes in the patch and into the cavity under the opening.

When the thus treated sheet metal or plastic part is subjected to heat treatment, such as occurs during the oven drying of the e-coat or paint, the foamable composition foams and expands in xy-direction to close off all of the holes in the patch, if present, as well as expands at and over all of the edges of the tape/patch to seal the edges and bond the die-cut patch to the body of the sheet metal substrate or plastic part.

In a similar manner, the tape patch can be applied to a gap in a sheet metal or plastic substrate, and then heat treated to expand the foam and seal the gap.

DETAILED DESCRIPTION

Brief Discussion of the Drawings

The construction of several embodiments of the bridge tape with directed foam expansion of the present invention is illustrated in the following figures, in which FIG. 1 illustrates a side view of a section of the bridge tape of the present invention having the following layers:

Layer 1 is a release liner on the adhesive coated backing (outer side),

Layer 2 is an adhesive coating or a two sided tape (outer side),

Layer 3 is a backing/carrier,

Layer 4 optional, is an adhesive coating or a two sided tape (inner side),

Layer 5 is a layer of a foamable composition,

Layer 6 optional, is an adhesive coating or a two sided tape (inner side),

Layer 7 is a backing/carrier,

Layer 8 filaments, threads or pins to fix the two backings/carriers to each other.

Figure 2:
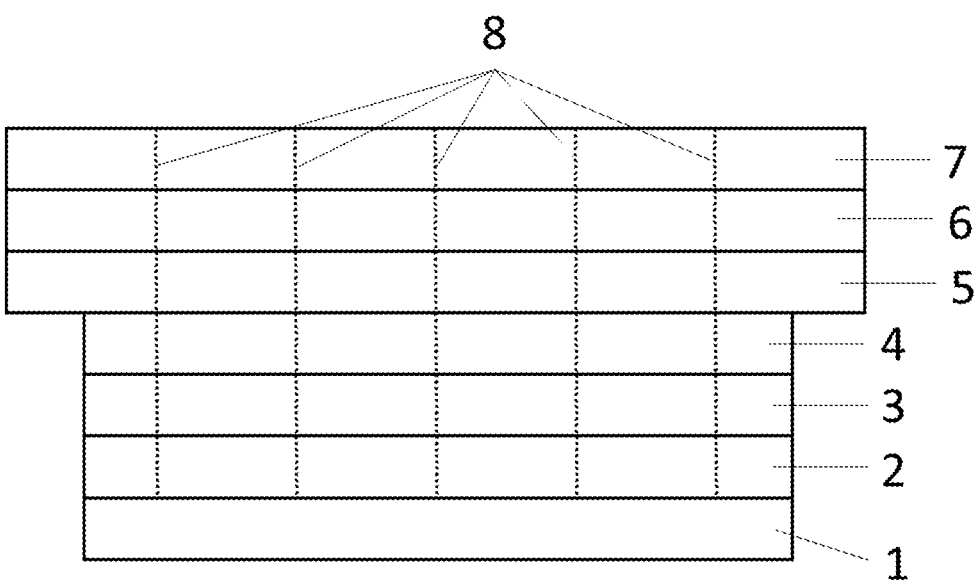

FIG. 2 illustrates an alternative embodiment of the bridge tape of the invention, in which the foamable composition can come into contact with the substrate since the size of the layers 1 (removed for application), 2, 3 and 4 is smaller than the size of the remaining layers 5, 6 and 7.

Figure 3:
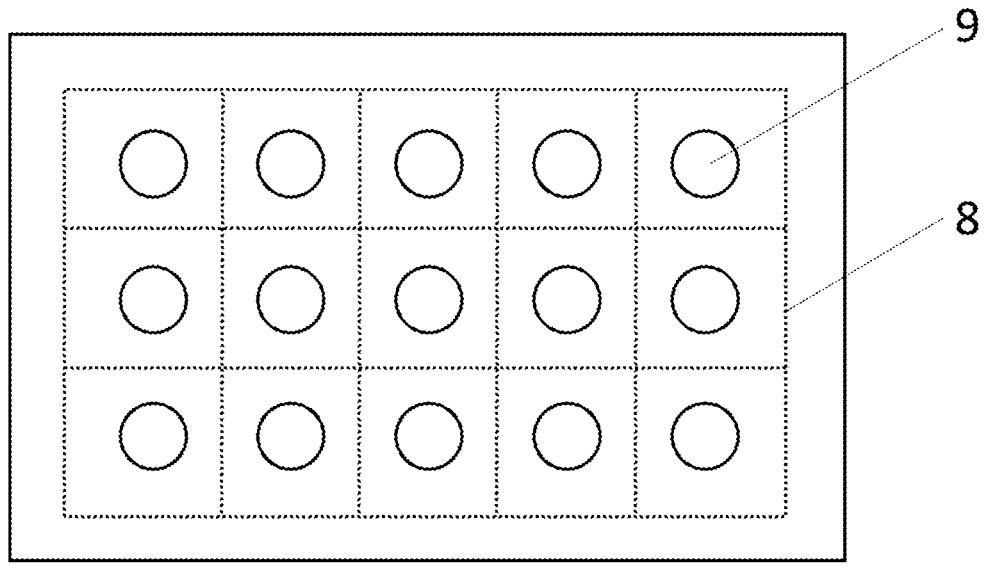

FIG. 3 illustrates the top view of the bridge tape patch of FIG. 2, after holes (9) have been punched into it. The dotted lines (8) symbolize the filaments, threads or pins to fix the two backings/carriers to each other.

Figure 4:
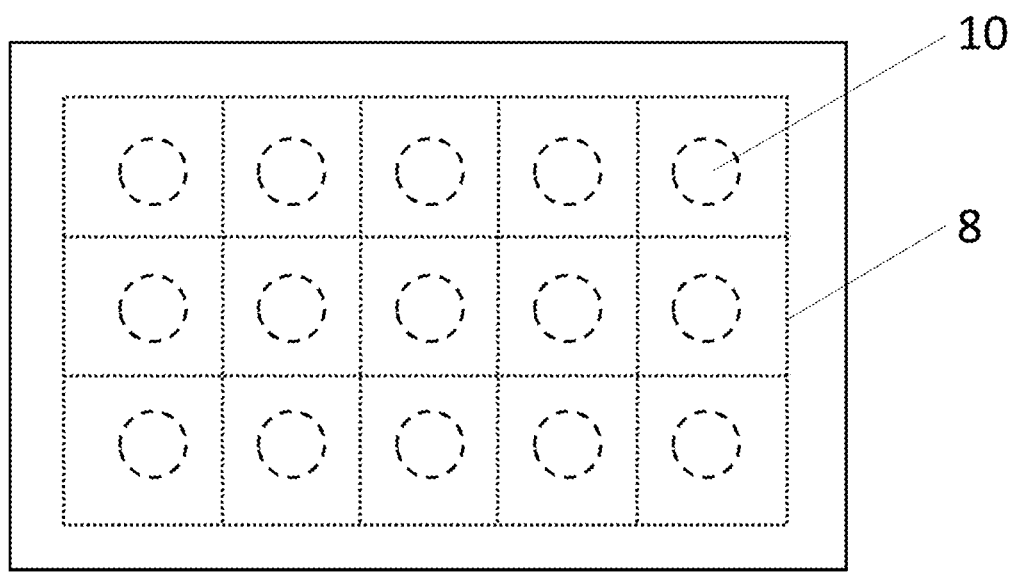

FIG. 4 illustrates the bridge tape patch of FIG. 3, after it has been subjected to heat treatment to cause the foamable composition in-between the two backings/carriers to foam and expand the foam in xy-direction to seal the holes, the sealed holes being illustrated in outline (10). The expansion in z-direction is only minor due to the fixation of the two backings/carriers by filaments, threads or pins.

As shown in FIG. 1, the bridge tape is formed of a layer of a foamable composition adhered to a backing material, such as a cloth liner having an adhesive coating or layer of a transfer tape, and a release liner over the adhesive coating or transfer tape.

As backing material it is possible to use all known textile carriers such as wovens, knits or nonwoven webs; the term "web" embraces at least textile sheetlike structures in accordance with EN 29092 (1988) and also stitchbonded nonwovens and similar systems. Both backings need not necessarily consist of the same materials.

Nonwovens contemplated include, in particular, consolidated staple fibre webs, but also filament webs, meltblown webs and spunbonded webs, which generally require additional consolidation. Possible consolidation methods known for webs include mechanical, thermal and chemical consolidation. Whereas with mechanical consolidations the fibres are held together purely mechanically usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malifleece" type from the company Karl Meyer, formerly Malimo, and can be obtained from companies including Naue Fasertechnik and Techtex GmbH. Malifleece is characterized in that a cross-laid web is consolidated by the formation of loops from fibres of the web.

The carrier used may also be a web of the Kunit or Multilknit type. A Kunit web is characterized in that it originates from the processing of a longitudinally oriented fibre web to form a sheetlike structure which has the heads and legs of loops on one side and has loop feeds or pile fibre folds on the other side, but possesses neither threads nor prefabricated sheetlike structures. A web of this kind as well has been produced for a relatively long time on stitchbonding machines of the "Kunitvlies" type from the company Karl Mayer. A further characterizing feature of this web is that, as a longitudinal-fibre web, it is able to absorb high tensile forces in the longitudinal direction. The characteristic feature of a Multiknit web relative to the Kunit web is that the web is consolidated on both the top and bottom sides by virtue of the double-sided needle punching.

Finally, stitchbonded webs as an intermediate are also suitable for forming a liner of the invention and a carrier of the invention. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

Also particularly suitable are needlefelt webs. With these webs, fibres or fibre webs are needled into the tuft by means of needles provided with barbs. By alternate introduction and withdrawal of the needles, the material is consolidated on a needle bar, with the individual fibres interlooping to form a firm sheetlike structure. The duration of this procedure determines the thickness and strength of the fibre structures, which are in general lightweight, air-permeable and elastic.

For the utilization of nonwovens in accordance with the invention, the adhesive consolidation of mechanically preconsolidated or wet-laid webs is of particular interest, it being possible to set consolidation to take place by way of the addition of binder in solid, liquid, foamed or paste-like form. A great diversity of theoretical embodiments is possible: for example, solid binders as powders for trickling in; as a sheet or as a mesh; or in the form of binding fibres. Liquid binders may be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for producing specific changes in the surface properties.

Such a procedure not only is sparing in its use of binder but also greatly reduces the energy requirement for drying. Since no squeeze rolls are required and the dispersions remain predominantly in the upper region of the web material, unwanted hardening and stiffening of the web can be largely avoided.

For sufficient adhesive consolidation of the web backing, the addition of binder in the order of magnitude of 1% to 50%, preferably 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, or else, given an appropriate selection of binder, by means of infra-red radiation, UV radiation, ultra-sound, high-frequency radiation or the like. For the subsequent end use it is sensible, though not absolutely necessary, for the binder to have lost its tack following the end of the web production process. It is advantageous that, as a result of the thermal treatment, volatile components such as fibre assistants are removed, giving a web having favourable fogging values, so that when a low-fogging adhesive is used, it is possible to produce an adhesive tape having particularly favourable fogging values; accordingly, the liner as well has a very low fogging value.

By fogging (see DIN 75201 A) is meant the effect where, under unfavourable conditions, compounds of low molecular mass may outgas from the adhesive tapes and condense on cold parts. As a result of this it is possible, for example, for the view through the windshield to be adversely affected.

A further special form of adhesive consolidation involves activating the binder by partial dissolution or partial swelling. In this case it is also possible in principle for the fibres themselves, or admixed speciality fibres, to take over the function of the binder. Since, however, such solvents are objectionable on environmental grounds, and/or are problematic in their handling, for the majority of polymeric fibres, this process is not often employed.

Starting materials envisaged for the textile carrier are, in particular, polyester, polypropylene, viscose or cotton fibres. The present invention, however, is not restricted to the stated materials; instead, as evident to the skilled person without having to take an inventive step, a multiplicity of further fibres may be used for producing the web.

Also suitable are laminates, films (for example PP, PE, PET, PA, PU), foams or foamed films.

In accordance with another preferred embodiment of the invention, the basis weight of the backing materials lies between 30 g/m² and 180 g/m².

A preferred backing material comprises woven cotton fabric, typically having a mesh count in the range of 140 to 160, preferably 148 (implying a warp thread count of 74 and a weft thread count of 74).

With further preference the weft count is 70 to 80 and/or the warp count is 70 to 80.

The adhesive of the invention is a pressure-sensitive adhesive, i.e. an adhesive which can give a durable bond with almost all adhesion substrates even when the pressure applied is relatively weak, and after use can in essence in turn be peeled from the adhesion substrate to leave no residue. A pressure-sensitive adhesive has a permanent pressure-sensitive adhesive effect at room temperature, i.e. because its viscosity is sufficiently low and its tack is high it wets the surface of the respective adhesion substrate even when the pressure applied is low. The adhesive bonding capability of the adhesive derives from its adhesive properties, and the peelability derives from its cohesive properties.

It is preferable that the layer of pressure-sensitive adhesive is based on natural rubber, synthetic rubber, or polyurethanes, and the layer of pressure-sensitive adhesive here is preferably composed exclusively of acrylate or mostly of acrylate (hotmelt or UV), in particular being viscoelastic, or else blends and copolymers.

The pressure-sensitive adhesive can have been blended with tackifiers in order to improve adhesive properties.

Suitable tackifiers, also termed tackifier resins, are in principle any of the known classes of substance. Examples of tackifiers are hydrocarbon resins (for example polymers based on unsaturated $C_5$- or $C_9$-monomers), terpene-phenolic resins, polyterpene resins based on raw materials such as α- or β-pinene, aromatic resins such as coumarone-indene resins or resins based on styrene or α-methylstyrene, for example colophony and its downstream products, e.g. disproportionated, dimerized or esterified colophony, e.g. reaction products with glycol, glycerol, or pentaerythritol, to mention just a few. Preference is given to resins without readily oxidizable double bonds, for example terpene-phenolic resins, aromatic resins, and particularly preferably resins produced via hydrogenation, for example hydrogenated aromatic resins, hydrogenated polycyclopentadiene resins, hydrogenated colophony derivatives, or hydrogenated polyterpene resins. Preference is given to resins based on terpene-phenolics and on colophony esters. Equally, preference is given to tackifier resins with softening point above 80° C. in accordance with ASTM E28-99 (2009). Particular preference is given to resins based on terpene-phenolics and on colophony esters with softening point above 90° C. in accordance with ASTM E28-99 (2009). Typical amounts used are from 10 to 100 parts by weight, based on polymers of the adhesive.

In order to achieve a further improvement in cable compatibility, the adhesive formulation can optionally have been blended with light stabilizers or primary and/or secondary antioxidants.

Antioxidants that can be used are UV absorbers, sterically hindered amines, thiosynergists, phosphites, or products based on sterically hindered phenols.

In order to improve processing properties, the adhesive formulation can moreover have been blended with conventional processing aids such as antifoams, deaerators, wetting agents, or flow control agents. Suitable concentrations are in the range from 0.1 up to 5 parts by weight, based on solids.

Fillers (reinforcing or nonreinforcing) such as silicon dioxides (spherical, acicular, lamellar, or irregular, for example the fumed silicas), glass in the form of solid or hollow beads, non-expandable, organic microspheres made of in particular phenolic resins, chalk, calcium carbonates, zinc oxides, titanium dioxides, aluminum oxides, or aluminum oxide hydroxides, carbon blacks, fibers, carbon nanotubes (CNTs), can serve to improve processability or adhesion properties. Suitable concentrations are in the range from 0.1 to 70 parts by weight, based on solids, in particular up to 40 parts by weight, particularly preferably from 1 to 20 parts by weight.

Fibers that can be used are (chemically derived) fibers (staple fibers or continuous filaments made of synthetic polymers, also known as synthetic fibers, made of polyester, polyamide, polyimide, aramid, polyolefin, polyacrylonitrile, or glass, (chemically derived) fibers made of natural polymers, for example cellulosic fibers (viscose, modal, lyocell, cupro, acetate, triacetate, Cellulon), or for example rubber fibers, or for example vegetable-protein fibers and/or for example animal-protein fibers and/or natural fibers made of cotton, sisal, flax, silk, hemp, linen, coconut, or wool. Yarns manufactured from the stated fibers are moreover equally suitable. Staple fibers are individual fibers of restricted length. Filaments (continuous fibers) are the opposite of staple fibers.

Preference is given to stable pressure-resistant hollow microspheres of which the shell is not based on polymers.

In particular, particular preference is also given to the combination of filling and resin addition. As can be seen from the data sets in the examples, addition of resin and of a filler can permit high maximal force in peel tests, at the same time as high shear resistance in terms of good holding power and a small value for shear under static load.

It is moreover possible to add the following, or to incorporate them by compounding: low-flammability fillers, such as ammonium polyphosphates, and also electrically conductive fillers, such as conductive carbon black, carbon fibers and/or silver-coated beads, and also ferromagnetic additives, such as iron(III) oxides, antioxidants, light stabilizers, antiozonants, before or after increasing the concentration of the polyacrylate.

Particular preference is given to expandable microballoons, because these permit foaming of the adhesive.

Microballoons involve resilient hollow spheres which have a thermoplastic polymer shell. Said spheres have a filling of low-boiling-point liquids or liquefied gas. Shell material used is in particular polyacrylonitrile, PVDC, PVC or polyacrylates. Particularly suitable as low-boiling-point liquid are hydrocarbons of the lower alkanes, such as isobutane or isopentane, enclosed in the form of liquefied gas under pressure within the polymer shell. Exposure of the microballoons, in particular exposure to heat, firstly softens the exterior polymer shell. At the same time, the liquid blowing gas present in the shell is converted to its gaseous state. During this process, the microballoons expand irreversibly and three-dimensionally. The expansion ends when the internal and external pressures are equal. The polymeric shell is retained, and the result here is therefore a closed-cell foam.

A wide variety of types of microballoon is available commercially, for example the Expancel DU products (dry unexpanded) from Akzo Nobel, which differ in essence in their size (from 6 to 45 μm diameter in the unexpanded state) and in the temperature at which they begin to expand (from 75 to 220° C.). If the type of microballoon and, respectively, the foaming temperature have been adjusted appropriately for the temperature profile required for the compounding of the material and the machine parameters, compounding of the material and foaming can also take place simultaneously in a single step.

Unexpanded types of microballoon are moreover also available in the form of aqueous dispersion with about 40 to 45% by weight content of solids or of microballoons, and also moreover in the form of polymer-bound microballoons (masterbatches), for example in ethyl-vinyl acetate with about 65% by weight microballoon concentration. The microballoon dispersions and the masterbatches are as suitable as the DU products for the foaming of adhesives in accordance with the process of the invention.

Other possible variants for the foaming of the adhesive can be chemical foaming with substances that cleave to give a gas, or the physical foaming that is known from the literature, via mechanical incorporation of gases such as air or nitrogen.

If the hollow bodies (in particular microballoons) introduced to form the foam are destroyed subsequently, it is nevertheless possible to obtain a non-syntactic foam of high quality.

Heat-activatable adhesive sheets may be used for the adhesive layer on the backing layer. Such heat-activatable adhesive sheets preferably have the following composition: i) a polymer, with a fraction of at least 30% by weight, a first section of the heat-activatable adhesive sheet being based with particular preference on reactive polyurethane, polyamide, nitrile rubber with reactive phenolic resins or reactive epoxy resins, and/or a second section being based on thermoplastic, non-reactive polyamides or epoxides, ii) one or more tackifying resins, with a fraction of 5% to 50% by weight, and/or iii) epoxy resins with hardeners, and accelerators, if desired, with a fraction of 5% to 40% by weight.

The adhesive sheets preferably have a thickness of from 10 to 500 μm.

The compositions for the adhesive sheet can be widely varied by changing the type and proportion of raw materials. It is also possible to obtain further product properties such as, for example, color, thermal conductivity or electrical conductivity, by means of selective additions of dyes, mineral and/or organic fillers, silicon dioxide for example, and/or powders of carbon and/or of metal.

The foamable layer is preferably formed of a foamable polyurethane composition or of an EVA (ethylene vinyl acetate), with a blowing agent, having a layer thickness prior to expansion of from about 1.5 to about 4 mm and comprising a foaming agent. A particularly preferred expandable foam is that formed of ethylene copolymers and available from ND Industries, Inc. under the product name NB169P041.

These materials are laminated together to form the bridge tape of the present invention. Once formed, the bridge tape is die cut to the size required for the particular use, and, if necessary, holes punched through it.

The fixation of both backings with the foamable composition in-between can be done with filaments, threads or pins. The material needs to withstand the oven temperatures during application and the pressure of the expanding foam. Preferred material is cotton, PET, PA or metal. The two backings can be fixed by e.g. sewing with thread.

FIG. 2 illustrates an alternative embodiment of the bridge tape of the invention, in which the foamable composition can come into contact with the substrate since the size of the layer 1 (removed for application), 2, 3 and 4 is smaller than the size of the remaining layers 5, 6 and 7. Thus the expanding foam is immediately in contact with the substrate and forms a secure bond which prevents any leakages during the lifetime of the automobile.

The invention claimed is:

1. A bridge tape comprising:
   a foamable composition comprising an expandable microballoon;
   a first backing material;
   a second backing material; and
   an adhesive coating or a two-sided adhesive tape,
   wherein:
   the foamable composition is disposed between the first backing material and the second backing material;
   the adhesive coating or the two-sided adhesive tape is disposed between the first backing material and the foamable composition; and
   the first backing material and the second backing material are fixed by a thread.

2. The bridge tape of claim 1, wherein the thread comprises:
   a continuous filament of a synthetic polymer selected from the group consisting of polyester, polyamide, polyimide, aramid, polyolefin, polyacrylonitrile, and glass;
   a manmade filament based on a natural polymer selected from the group consisting of cellulosic filaments and rubber filaments; or
   a natural filament comprising cotton, sisal, flax, silk, hemp, linen, coconut, or wool.

3. The bridge tape of claim 1, wherein the bridge tape has been die-cut to form a die-cut patch.

4. The die-cut patch of claim 3, wherein the first backing material is of a smaller size than the second backing material.

5. The die-cut patch of claim 3, further comprising a plurality of holes passing through the die-cut patch.

6. The bridge tape of claim 1, wherein the first backing material is a cloth tape.

7. The bridge tape of claim 1, further comprising a further adhesive coating or a two-sided adhesive tape disposed between the second backing material and the foamable composition.

8. The bridge tape of claim 7, further comprising a release liner.

9. The bridge tape of claim 8, further comprising a second further adhesive coating or a second two-sided adhesive tape, wherein the second further adhesive coating or the second two-sided adhesive tape is disposed between the second backing material and the release liner.

10. A method comprising:
    covering an opening with the die-cut patch of claim 3;
    applying a liquid coating material to the opening by passing the liquid coating material through a hole passing through the die-cut patch; and
    heating the die-cut patch, thereby causing a foamable composition to foam to form a foamed composition, wherein the foamed composition seals the opening.

* * * * *